(No Model.) 2 Sheets—Sheet 1.
J. APPLEBY.
DRIVE CHAIN.
No. 521,007. Patented June 5, 1894.
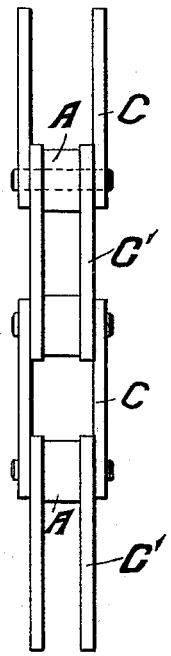
FIG.1
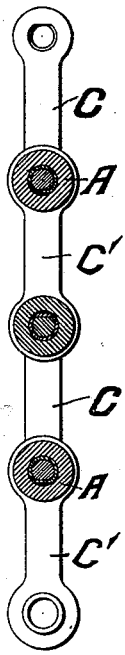
FIG.2
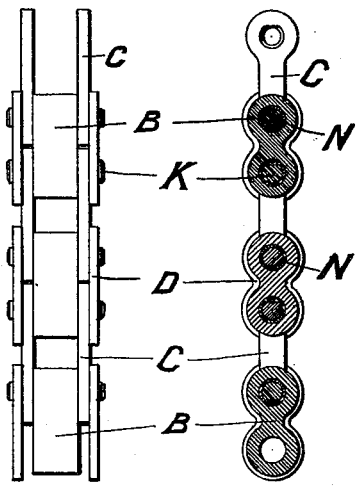
FIG.3
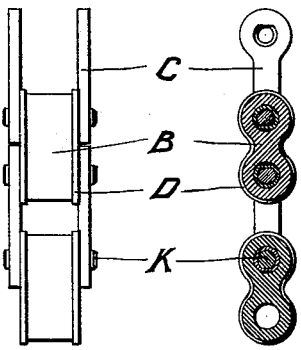
FIG.4
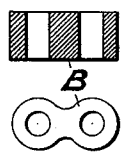
FIG.5
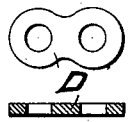
FIG.5ᴬ
FIG.6
FIG.7
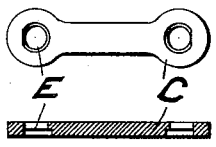
FIG.8
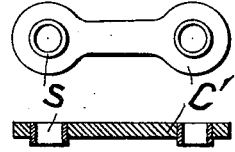
FIG.9
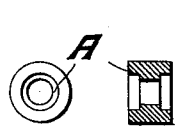
FIG.10
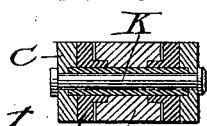
FIG.10ᵃ
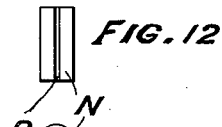
FIG.11
FIG.12
Witnesses:
E. B. Bolton
E. K. Sturtevant
Inventor:
Joseph Appleby
By Richards
his Attorneys.
THE NATIONAL LITHOGRAPHING COMPANY,
WASHINGTON, D. C.

(No Model.) 2 Sheets—Sheet 2.

J. APPLEBY.
DRIVE CHAIN.

No. 521,007. Patented June 5, 1894.

Witnesses:
E. B. Bolton
E. K. Sturtevant

Inventor:
Joseph Appleby
By Richards
his Attorneys.

UNITED STATES PATENT OFFICE.

JOSEPH APPLEBY, OF BIRMINGHAM, ENGLAND.

DRIVE-CHAIN.

SPECIFICATION forming part of Letters Patent No. 521,007, dated June 5, 1894.

Application filed October 6, 1893. Serial No. 487,319. (No model.) Patented in England May 24, 1892, No. 9,805.

*To all whom it may concern:*

Be it known that I, JOSEPH APPLEBY, a subject of the Queen of Great Britain, residing at Birmingham, in the county of Warwick, Kingdom of England, have invented certain new and useful Improvements in Driving-Chains, of which the following is a specification.

A patent for this invention has been granted in Great Britain, No. 9,805, dated May 24, 1892.

This invention relates to the manner in which I construct and arrange metal chains for use upon cycles and general machinery, for driving purposes, and has reference principally to the manner in which I provide for a fixed rivet pin or central stud, for the improved methods of connecting the links or plates in a manner to more effectually sustain the tension upon the chains while providing for improved bearing surfaces of chains for the teeth of the driving wheels to work against, and also for increased wearing surfaces upon the chain.

Figure 17:
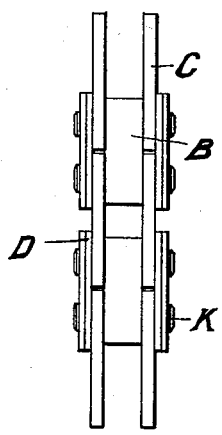
Figures 18, 19:
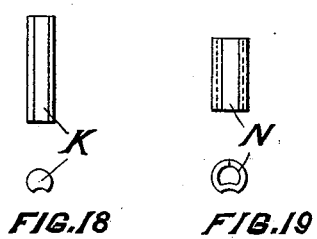
Figure 20:
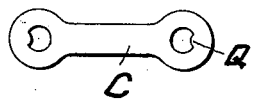
Figure 23:
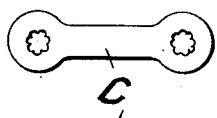
Figures 24, 25:

Referring to the two accompanying sheets of explanatory drawings—Figures 1 and 2 illustrate in front and sectional elevations one type of driving chain to which my invention is applied. Figs. 3 and 4 similarly illustrate another type of driving chain to which my invention is applied. Fig. 5 shows a section and elevation of the double block B (Figs. 3 and 4), while Fig. 5ª similarly shows a detail of my supplementary plate D (Figs. 3, 4 and 17). Figs. 6 and 7, 11 and 12, 13 and 14, 18 and 19 and 21 and 22 illustrate in detail different forms of central pin and sleeve which I sometimes employ. Figs. 8 and 9 show elevations and sections of the links C and C' (Figs. 1 and 2). Fig. 10 shows detail views of the roller or single block A (Figs. 1 and 2). Fig. 10ª is a transverse section through the links. Figs. 15 and 16 illustrate in front and sectional elevations my invention applied to the same type of driving chain as illustrated in Figs. 3 and 4, showing an improved form of double block which I sometimes employ while Fig. 17 shows in front elevation a similar chain having double supplementary plates arranged on the outer side of each of the side links. Figs. 18 and 19 show modified forms of the pin and sleeve. Figs. 20 and 23 illustrate in elevations and sections side link plates showing two forms of recesses or holes which I sometimes provide for the reception of the ends of similarly shaped pins or rivets. Figs. 24 and 25 illustrate in plans and elevations, a form of pin or rivet which I sometimes employ, and a corresponding single block which I use without an independent sleeve.

In carrying my invention into effect as shown in Figs. 1 and 2, in which rollers or bowls are arranged between the inner links or side plates—I form said inner links C' with central holes to receive steel bushes S which I place therein, so that they will fit tightly and project a short distance beyond the surface on the inner side of the link plate as shown in elevation and sectional plan at Fig. 9. I provide a concentric hole within the bowl or roller A which I recess or enlarge on each side as shown in side and front sectional elevations at Fig. 10; the recesses being of a a depth to suit the projecting portions of the bushes S, (which prevent the displacement of the bowls or rollers even when the pins are removed.) Through the bowls or rollers I pass a long sleeve N such as shown in plan and elevation at Fig. 7 of a length sufficient to pass through the central bowl and the inner side plates connected therewith on each side, and then to project slightly beyond in order to enter suitable recesses E formed within the outer side plates or links —C— having the same peculiar shape as the sleeve, the rotation of said sleeve being thereby prevented. One such outer side plate is shown in elevation and sectional plan at Fig. 8, having recesses E suitably shaped for the reception of the ends of the sleeve N. I connect the whole of the side plates and central bowl together by means of a long pin or rivet as shown in plan and elevation at Fig. 6; the rivet being of a shape to receive the sleeve N and so capable of preventing rotation when united with the outside links C. I sometimes place a key or keys upon the pin to enter recesses or key ways cut within the outside plates. The central rollers, bowls or blocks A I prefer to form with semicircular tooth bearing surfaces as illustrated.

When constructing my improved chain with the central portions of the links in the form of double blocks such as B (Figs. 3 and 4), to suit two rivets or pins I form the side or link plates C out of steel or other suitable metal, and I make holes within the plates at any desired distance or pitch for receiving the rivets or connecting pins and sleeves. These holes I form of a shape other than circular so that when the similarly shaped pin K is placed therein, the pin is prevented from revolving or moving in the link plates. I place a distance piece or sleeve N which is formed out of sheet metal, over the central pin, arranged when placed thereon to fit the peculiar shape of the pin, so that the sleeve will be stationary, quite incapable of working loose. The holes within the side plates I make to suit the shape of the sleeve when arranging that the sleeve shall pass through into the plates.

Figure 13:
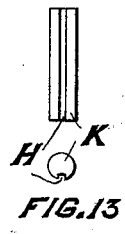
Figure 14:
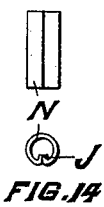
Figures 15, 16:
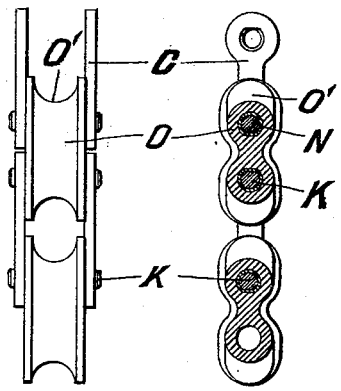
Figures 21, 22:
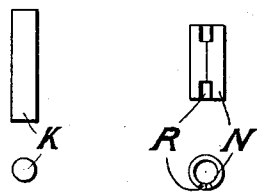

Figs. 11 and 12 show in plans and elevations another form of central pin and sleeve which I sometimes employ; the projection F on the pin K being made suitable for passing through the slot or passage G formed in the sleeve N; while Figs. 13 and 14 similarly show a modification where the sleeve N has a projection J formed within its interior for passing into a groove H formed on the pin K. Figs. 21 and 22 show in similar views a further modification of central pin and sleeve, in which recesses or slots are provided at each end of the sleeve for receiving a nipple or projection —Q— formed within the eye or pin hole of a side plate such as illustrated in the elevation and section at Fig. 20; the pin K being left plain as illustrated.

Figs. 18 and 19 illustrate another modification of my central pin and sleeve which I may also use when employing a link plate such as illustrated in Fig. 20, while Figs. 24 and 25 illustrate my central pin and block, said block having a hole grooved to receive the fluted pin K, the block being thereby secured from rotation and the independent sleeve N being dispensed with. Figs. 15 and 16 show my improved chain having the central portion of the ends of the double blocks O semi-circularly recessed to provide for a better bearing surface —O'— for the teeth of the wheel.

I prefer to form my improved chain with supplementary supporting links D (Figs. 3, 4 and 5ª) for preventing a sudden snatch or pull which may be given to the chain from causing rupture or damage when hardened steel central blocks are employed. These supplementary links I may place inside or outside the ordinary side plate links as shown in Fig. 3 or 4; but in each case I arrange that the rivet or central pin shall pass through the block and the four thicknesses of plate before being riveted up. I sometimes also provide two supplementary plates on the outside of the link plates as shown at Fig. 17. When employing central blocks of ordinary metal not hardened I may and generally do dispense with the supplementary links.

I do not limit the application of my invention to any particular form or size of chain or to any special arrangement of cycle lawn mower or other machine, whereupon such chains may be employed, but I modify the same essential features hereinbefore described to suit any particular requirement.

It will be noticed that in all the forms, the pivot pin is non circular or it may be said to be of "angular" cross section and this term is used herein to cover a pin or loose sleeve having a flat face or any other cross sectional configuration other than circular.

Having now particularly described and ascertained the nature of my said invention and in what manner the same is to be performed, I declare that what I claim is—

1. A drive chain comprising the central angular pin fitted rigidly to the outer links, against rotation, a loose distance piece or sleeve independent of the links fitted to the pin and having an angular interior conforming thereto, whereby it will be held against rotation and having a cylindrical exterior and the inner links and bowls fitted thereto to turn thereon, substantially as described.

2. In combination in a drive chain, the angular central pin, the loose distance sleeve having an internal space conforming to the angular pin to be held thereto against rotation, and having recessed or slotted ends, the links, having openings for receiving the ends of the distance piece, said openings having nipples or projections to fit the recesses in the ends of the distance pieces to hold the sleeve rigid, said sleeve having the outer cylindrical bearings for the inner links and bowls and the bowls or rollers arranged on the distance pieces, substantially as described.

In witness whereof I have hereunto set my hand in presence of two witnesses.

JOSEPH APPLEBY.

Witnesses:
WILLIAM EDWARD EVANS,
ALBERT EDWARD PARKER.